May 26, 1964 E. S. SMYRNI ETAL 3,134,608
CHILD'S SELF-PROPELLED VEHICLE
Filed June 21, 1961 2 Sheets-Sheet 1

INVENTORS
EMANUEL S. SMYRNI
EDWARD T. CARLIN
BOBBIE L. WHITE

BY Strauch, Nolan & Neale

ATTORNEYS

May 26, 1964 E. S. SMYRNI ETAL 3,134,608
CHILD'S SELF-PROPELLED VEHICLE
Filed June 21, 1961 2 Sheets-Sheet 2

INVENTORS
EMANUEL S. SMYRNI
EDWARD T. CARLIN
BOBBIE L. WHITE

BY

ATTORNEYS 3,134,608
CHILD'S SELF-PROPELLED VEHICLE
Emanuel S. Smyrni, Bossier City, and Edward T. Carlin and Bobbie L. White, Shreveport, La., assignors to Universal Manufacturing Company, Bossier City, La., a corporation of Louisiana
Filed June 21, 1961, Ser. No. 118,720
10 Claims. (Cl. 280—257)

The present invention relates to improvements in self-propelled vehicles for children and more particularly to hand powered pedal steered self-propelled vehicles for children.

The primary object of the present invention is to provide an improved form of hand actuated, self-propelled vehicles of the type commonly known as an "Irish Mail" which is strong, rugged and sturdy in construction and which is constructed and arranged so that it can be used and enjoyed by children without danger of injury.

Examples of prior vehicles of the general type which the present invention relates will be found in U.S. Patent No. 834,368, issued October 30, 1906 to C. D. Dews for "Wagon"; U.S. Patent No. 813,422 issued February 27, 1906 to H. Hill for "Self-Propelled Vehicle"; U.S. Patent No. 1,342,440 issued June 8, 1920 to J. O. Hamel for "Self-Propelled Vehicle" and in U.S. Patent No. 1,556,798 issued October 13, 1925 to J. Montanaro for "Child's Road Roller."

In vehicles of this type, it has been customary for the most part to provide pedals coaxial with the axle of the front wheel or wheels by which the front wheel or wheels can be steered relative to the vehicle body. In certain of the prior art constructions, there has been a danger of the child's foot being pinched or his ankle twisted upon sharp steering of the front axle by the child's ankle or foot being caught between the axle and the frame. In addition, the drive trains between the hand lever and the rear driven axle have, for the most part, in order to obtain the necessary speed ratio, necessitated the use of cumbersome drive connections and support structures therefor with resultant unduly high center of gravity of the vehicle and of the child seated upon the vehicle. As a result, in such prior art constructions, there has also been substantial danger of injury to the child by the vehicles overturning with the child and by the child sliding from the seat in rounding corners.

The present invention provides a pedal steered and hand powered self-propelled vehicle for children which: (a) has an all steel tubular triangular truss chassis providing rigidity of construction, (b) which is easily pumped, (c) which is easily and rapidly accelerated (d) which is easily steered, and (e) which has a low center of gravity providing stability and preventing overtipping.

These and other objects of the present invention will become more fully apparent by reference to the appended claims and as the following detailed description proceeds in reference to the accompanying drawings wherein:

FIGURE 4 is a fragmentary sectional view taken substantially along the line 4—4 of FIGURE 2;

FIGURE 5 is a fragmentary sectional view taken substantially along 5—5 of FIGURE 2;

FIGURE 6 is a fragmentary sectional view taken substantially along the line 6—6 of FIGURE 3; and FIGURE 7 is a fragmentary sectional view taken substantially along the line 7—7 of FIGURE 3.

Figure 1:
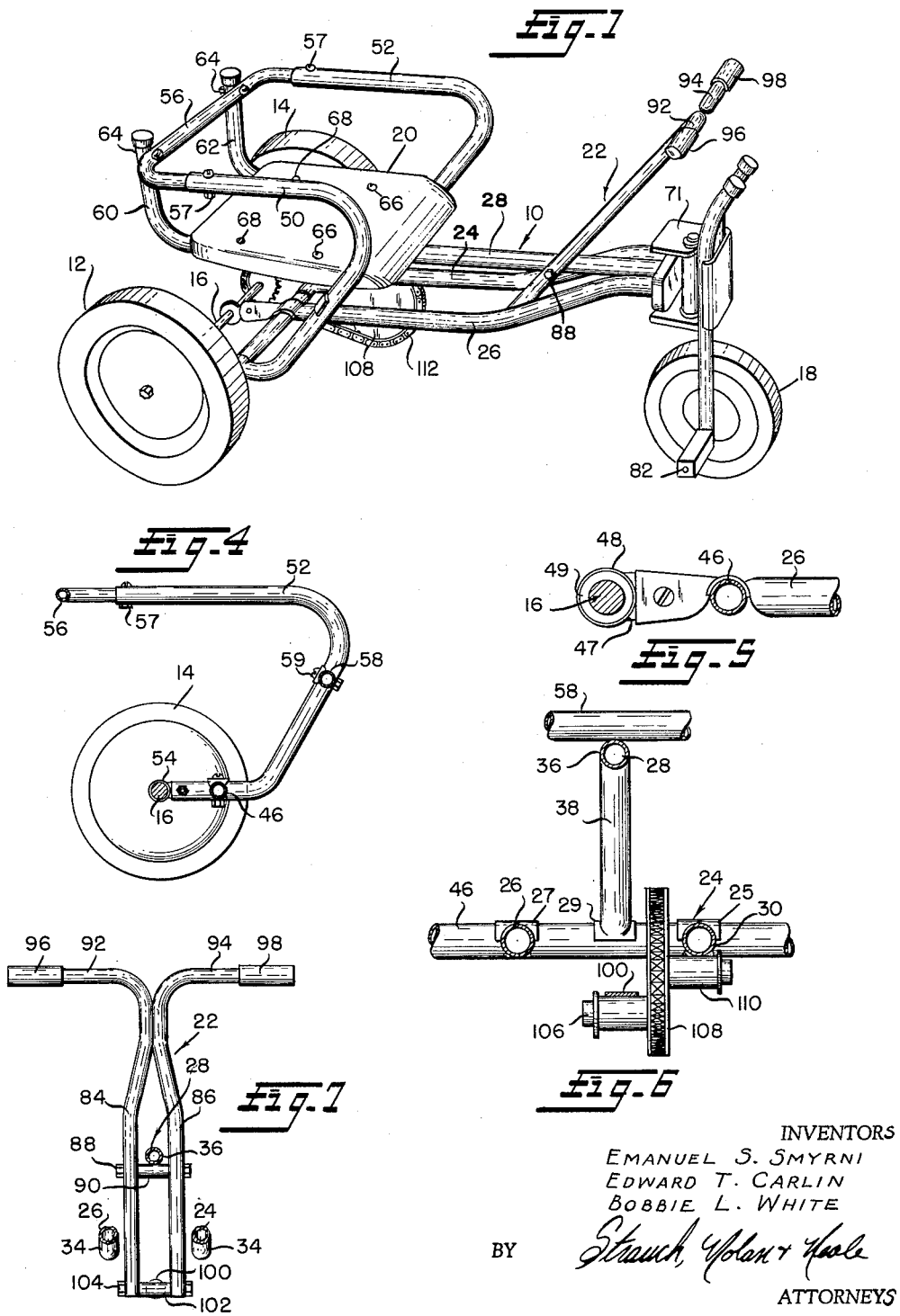
FIGURE 1 is a perspective view of the vehicle of the present invention.

Referring now in detail to the drawings and particularly to FIGURE 1, the vehicle of the present invention comprises a chassis 10 supported at its rearward end by drive wheels 12 and 14 fixed to the opposite ends of an axle shaft 16 journalled on chassis 10, a front pedal controlled dirigible wheel 18 mounted for pivotal movement upon the front of the chassis 10, a seat 20 mounted on the chassis 10, a hand actuated driving lever 22 pivoted upon the chassis 10 and drive connected to the axle shaft 16 as will be explained presently.

Figure 2:
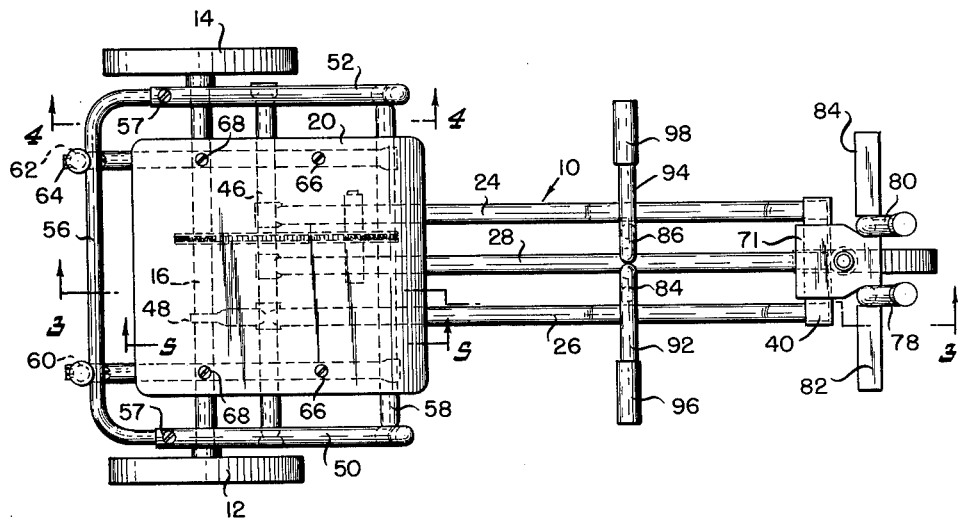
FIGURE 2 is a top plan view of the vehicle of FIGURE 1.
Figure 3:
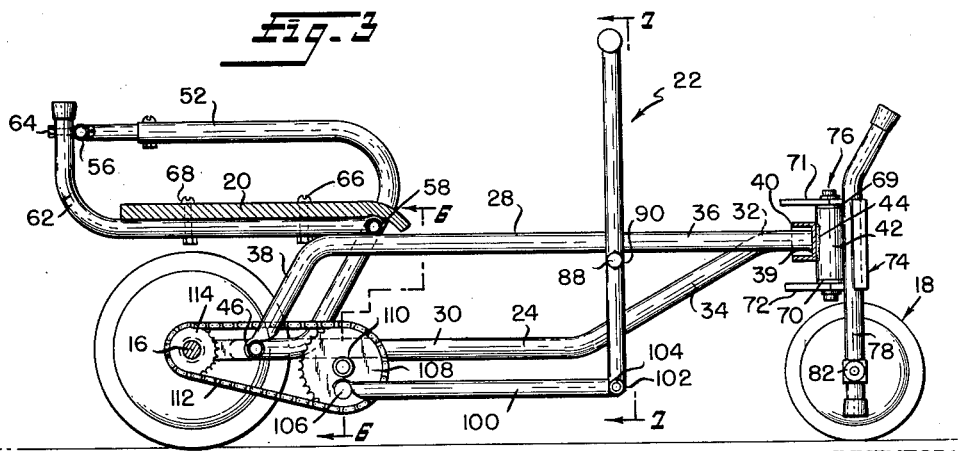
FIGURE 3 is a sectional view taken substantially along the line 3—3 of FIGURE 2.

Referring to FIGURES 2, 3 and 6, the chassis 10 comprises a pair of spaced parallel lower hollow tubular steel members 24 and 26, each of the configuration illustrated in FIGURE 3 for member 24, and an upper hollow tubular steel member 28 located above and substantially equidistantly between members 24 and 26 so that, as viewed in transverse cross section as in FIGURES 6 and 7, the members 24, 26 and 28 define the corners of a triangle. Members 24 and 26 each have a lower horizontally extending portion 30 and upper horizontally extending portion 32 at their forward end and an interconnecting upwardly and forwardly inclined portion 34. Member 28 has an upper horizontal portion 36 lying in the same plane as the portions 32 of members 24 and 26 and a downwardly inclined rear portion 38 terminating substantially in the plane of the portions 30 of the members 26 and 24.

At their forward ends, members 24, 26 and 28 are received within and rigidly fixed to the base wall 39 of a transversely extending cap shaped member 40 which in turn is fixed to a vertically extending bearing housing 42 as by welding at 44.

The members 24, 26 and 28 are crimped to form semi-cylindrical sockets 25, 27 and 29 (FIGURE 6) at their rearward ends embracing and rigidly connected to a transversely extending tubular steel brace 46 as by welding. As is apparent from FIGURES 2 and 5, member 26 extends rearwardly of brace 46 and is transversely compressed at its rear end to form a non-cylindrical end bore non-rotatably receiving the shank 47 of the retainer 48 for a ball bearing 49 and thus provides a central bearing support for the axle shaft 16.

Fixed to the transverse brace 46 at its outer ends are a pair of C-shaped hollow tubular steel frame members or outriggers 50 and 52 each of the configuration shown for member 52 in FIGURE 4. Members 50 and 52 at their lower ends are transversely compressed to receive the forwardly extending shank of the retainers for the ball bearing journals for shaft 16 adjacent the wheels 12 and 14 as indicated for the member 52 at 54 in FIGURE 4. The rearwardly and horizontally extending upper ends of members 50 and 52 are interconnected by a transversely and horizontally extending U-shaped hollow tubular steel member 56 as shown in FIGURE 2. The ends of member 56 interfit within the bores of members 50 and 52 and are fixed therein by bolt and nut assemblies 57. Members 50 and 52 are interconnected by a further transverse horizontal tubular steel brace 58, the crimped ends of which are rigidly connected thereto by bolt and nut assemblies 59 at its opposite ends. Brace 58 overlies and rests upon the horizontal portion 36 of member 28 as best shown in FIGURE 6.

The U-shaped member 56 provides a back support and the upper portion of members 50 and 52 provide arm rests for a child sitting upon seat 20. The seat 20 is supported upon the chassis 10 by L-shaped members 60 and 62 each of the configuration illustrated in FIGURE 3 for member 62 fixed as by nut and bolt assemblies 64 at their rear upper ends to the U-shaped member 56 and fixed at their crimped lower forward ends to the transverse brace 58 by bolt and nut assemblies. The seat 20 is fixed as by bolt and nut assemblies 66 and 68 to the horizontal portions of the members 60 and 62.

Referring again to FIGURE 3, the vertically extending bearing housing 42 supports at its opposite ends a pair of radially flanged nylon bushings 69 and 70 and extends between the upper and lower arms 71 and 72 of a bracket 74 pivotally mounted upon the housing 42 by a vertically extending pivot bolt 76. Bushings 69 and 70 isolate housing 42 from contact with bracket 74 and bolt 76 and due to the corrosion resistance and self-lubricating bearing qualities of nylon, assure long life and quiet operation without the need for lubrication. The front dirigible wheel 18 lies between and is journalled on the lower ends of a pair of upstanding legs 78 and 80 which are fixed to the bracket 74 as by welding. Steering pedals 82 and 84 are fixed to the members 78 and 80 coaxial with the axis of wheel 18 to permit pedal steering of the vehicle by turning of the wheel 18 under pedal control about the axis of the pivot pin 76. The limits of piovtal movement of wheel 18 about the axis of bolt 76 are established by abutment of the opposite sides of bracket 74 with member 40. The positive limit of pivotal steering motion of wheel 18, the external location of pedals 82 and 84 and the clearance between wheel 18 and chassis 10 as shown in FIGURE 3 cooperate to assure that a child cannot injure his leg or ankle while steering.

Power is transmitted to axle shaft 16 from the lever 22 by a linkage now to be described. The lever 22 comprises, as is best shown in FIGURE 7, a pair of rigidly interconnected upstanding bars 84 and 86 embracing the horizontal portion 36 of the member 28 and pivoted thereto by a pivot stud 88 passing through the arms 84 and 86 and a bearing bushing 90 fixed to member 28 as by welding. Members 84 and 86 terminate at their upper ends in laterally extending handle bar portions 92 and 94 receiving elastomeric hand grip caps 96 and 98 thereon. At their lower ends, bars 84 and 86 embrace the forward end of a connecting rod 100 and the transverse bushing 102 fixed to the forward end thereof as by welding and through which the pivot pin 104 extends. Connecting rod 100 is eccentrically connected by pivot pin 106 (FIGURES 3 and 6) to a relatively large sprocket 108 journalled in a bearing 110 mounted on the horizontally extending portion 30 of the member 24. A chain 112, engaging sprocket 108, and a relatively small sprocket 144, engaged by chain 112 and fixed to the axle shaft 16 intermediate bearing 48 and 54, complete the drive train between lever 22 and drive wheels 12 and 14. Since a child sitting on seat 20 is braced by member 56 at his back and by pedals 82 at his feet, he can actuate lever 22 to produce either forward or reverse motion of the vehicle.

As is apparent, the bearing arrangement for axle shaft 16 transmits the weight of the vehicle chassis and of its passenger to the axle shaft 16 through the bearings 54 adjacent wheels 12 and 14. The axle shaft 16 is thus subjected to relatively low beam loading due to the vehicle and passenger weight but is adequately supported adjacent its center by the bearing 48 against deflection in response to driving torque applied thereto through the sprocket 114 from the hand lever 22.

The disclosed arrangement of the vehicle drive permits location of the seat but slightly above the level of the top of the wheels 12 and 14 and locates the center of gravity of a passenger sitting on seat 20 substantially directly above the axle shaft 16 so that there is no material possibility of the vehicle tipping over while rounding corners at relatively high speeds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hand powered pedal steered child's vehicle comprising a longitudinally elongated chassis formed of a longitudinally extending upper tubular member and two longitudinally extending lower tubular members forming a longitudinally extending prism of triangular cross section, said members being rigidly interconnected at their opposite ends, a dirigible wheel pivotally mounted upon and supporting one end of said chassis, non-dirigible drive wheels journalled upon and supporting the opposite end of said chassis, a seat fixed to said chassis above the rotation axis of said drive wheels, a hand operated lever pivotally mounted on said chassis intermediate said seat and said chassis end supported by said dirigible wheel for pivotal motion about a transverse axis, and a drive train on said chassis operatively interconnecting said lever and said drive wheels to drive the latter, said lower tubular members extending between said seat and said dirigible wheel end of said chassis with a substantially uniform, relatively narrow, lateral spacing to enable a child to readily straddle said chassis when operating said vehicle.

2. The vehicle defined in claim 1 wherein the tubular member forming said chassis have longitudinally extending parallel portions extending between said seat and lever, one of said tubular member parallel portions lying in the vertical longitudinal center plane of said vehicle immediately below the level of said seat and other of said tubular member parallel portions lying at substantially the level of the axis of rotation of said drive wheels, said other tubular member parallel portions being substantially equidistantly spaced on opposite sides of said vertical longitudinal center plane.

3. The vehicle defined in claim 1 wherein said drive train comprises a shaft fixed at its opposite ends to said drive wheels and journalled upon said chassis, first sprocket fixed to said shaft, a second sprocket journalled on said chassis intermediate said lever and said shaft, a chain drive connecting said sprockets, and a drive rod pivotally connected to said lever below its pivot to said chassis and eccentrically drive connected to said second sprocket.

4. The vehicle as defined in claim 1, wherein said seat is surmounted by a U-shaped, child retaining, tubular member forming side arms and a back support for said seat.

5. A chassis for a child's wheeled vehicle comprising three longitudinally extending tubular members, two of said longitudinally extending members being identical in form and disposed in parallel relation with a relatively narrow lateral spacing to enable a child to readily straddle said chassis when operating said vehicle, said two longitudinally extending members having a rearward horizontal lower portion and a forward upwardly inclined portion, the other of said members being disposed intermediate said identical members having an upper horizontal portion disposed midway between the upwardly inclined portions of the first two members and rigidly connected thereto at its forward end and a downwardly inclined rear portion rigidly interconnected to the rear ends of said first two members whereby said chassis is in the form of a longitudinally extending prism of triangular cross section.

6. A hand powered, pedal steered child's vehicle comprising a longitudinally elongated chassis formed of longitudinally extending tubular members rigidly interconnected at their opposite ends, a dirigible wheel pivotally mounted upon and supporting one end of said chassis, non-dirigible drive wheels journalled upon and supporting the opposite end of said chassis, a seat fixed to said chassis above the rotation axis of said drive wheels, a hand operated lever pivotally mounted on said chassis intermediate said seat and said chassis end supported by said dirigible wheel for pivotal movement about a transverse axis, said tubular members of said chassis having longitudinally extending parallel portions extending between said seat and said lever with one of said tubular member parallel portions lying in the vertical longitudinal center plane of said vehicle immediately below the level of said seat and other of said tubular member parallel portions lying at substantially the level of the axis of rotation of said drive wheels, said other tubular member parallel portions being substantially equidistantly spaced at opposite sides of said verticle longitudinal center plane, said seat being disposed between a pair of rearwardly facing substantially C-shaped side frames lying on opposite sides of the rear end of said chassis, said side frames each comprising horizontal upper and base portions and an upwardly inclined interconnecting intermediate portion, a first transverse brace fixed at its opposite ends to said side frame base portions and to each of said tubular members, a second transverse brace fixed at its opposite end to said side frame intermediate portions and to said one tubular member parallel portion, said drive wheels being journalled upon the rear ends of said side frame base portions, and a drive train on said chassis operatively interconnecting said lever and said drive wheels to drive the latter.

7. The vehicle defined in claim 6 wherein said drive wheels are interconnected by an axle shaft and wherein the central portion of said axle shaft is journalled upon the rear end of one of said other tubular member parallel portions.

8. The vehicle defined in claim 6 wherein the ends of said side frame upper portions are interconnected by an interfitting substantially U-shaped tubular member and wherein said seat is carried by a pair of longitudinally extending parallel L-shaped members fixed to said second brace and to said U-shaped member at their opposite ends.

9. A hand powered, pedal steered child's vehicle comprising a longitudinally, elongated chassis formed of a longitudinally extending upper tubular member and of two longitudinally extending lower tubular members forming a longitudinally extending prism of triangular cross section, said members being rigidly interconnected at their opposite ends, a dirigible wheel pivotally mounted upon and supporting one end of said chassis, a shaft having non-dirigible drive wheels at opposite ends thereof, said shaft being journalled upon longitudinally extending outriggers fixed to the rear of said chassis and lying adjacent the paths of rotation of said drive wheels to support the opposite end of said chassis, a seat fixed to said chassis above the rotation axis of said drive wheels, a hand operated lever pivotally mounted on said chassis intermediate said seat and said chassis end supported by said dirigible wheel for pivotal motion about a transverse axis, and a drive train on said chassis operatively interconnecting said lever and said drive wheels to drive the latter.

10. A hand powered, pedal steered child's vehicle comprising a longitudinally elongated chassis formed of a longitudinally extending upper tubular member and two longitudinally extending lower tubular members forming a longitudinally extending prism of triangular cross section, said members being rigidly interconnected at their opposite ends, a dirigible wheel pivotally mounted upon and supporting one end of said chassis, non-dirigible drive wheels journalled upon and supporting the opposite end of said chassis, a seat fixed to said chassis above the rotation axis of said drive wheels, a hand operated lever pivotally mounted on said chassis intermediate said seat and said chassis end supported by said dirigible wheel for pivotable motion about a transverse axis, and a drive train on said chassis operatively interconnecting said lever and said drive wheels to drive the latter, said tubular members of said chassis having longitudinally extending parallel portions extending between said seat and said lever, one of said tubular member parallel portions lying in the vertical longitudinal center plane of said vehicle immediately below the level of said seat and other of said tubular member parallel portions lying at substantially the level of the axis of rotation of said drive wheels, said other tubular member parallel portions being substantially equidistantly spaced on opposite sides of said vertical longitudinal center plane, said lever being formed by a pair of interconnected upstanding tubular members having oppositely laterally extending hand grip portions, said upstanding tubular members embracing and being pivotably mounted upon said one tubular parallel portion and extending between said other tubular member parallel portions.

References Cited in the file of this patent

UNITED STATES PATENTS

| | | |
|---|---|---|
| 593,597 | Millar | Nov. 16, 1897 |
| 647,505 | Maxim et al. | Apr. 17, 1900 |
| 827,244 | Larson | July 31, 1906 |
| 1,403,607 | Kunst | Jan. 17, 1922 |
| 2,464,952 | Warburton | Mar. 22, 1949 |
| 2,928,682 | Spencer et al. | Mar. 15, 1960 |

FOREIGN PATENTS

| | | |
|---|---|---|
| 955,077 | France | June 20, 1949 |

UNITED STATES PATENT OFFICE

CERTIFICATE OF CORRECTION

Patent No. 3,134,608                              May 26, 1964

Emanuel S. Smyrni et al.

It is hereby certified that error appears in the above numbered patent requiring correction and that the said Letters Patent should read as corrected below.

Column 3, line 45, for "144" read -- 114 --; column 6, line 36, after "tubular" insert -- member --.

Signed and sealed this 29th day of September 1964.

(SEAL)
Attest:

ERNEST W. SWIDER
Attesting Officer

EDWARD J. BRENNER
Commissioner of Patents